March 12, 1968 J. R. BOGARD ET AL 3,372,890
DATA PROCESSOR FOR CIRCULAR SCANNING TRACKING SYSTEM
Filed Feb. 4, 1966
3 Sheets-Sheet 1

INVENTORS
JAMES R. BOGARD
ROGER A. GASKILL
G. L. HARMON

BY Julian C. Renfro
ATTORNEY

March 12, 1968     J. R. BOGARD ET AL     3,372,890
DATA PROCESSOR FOR CIRCULAR SCANNING TRACKING SYSTEM
Filed Feb. 4, 1966     3 Sheets-Sheet 2
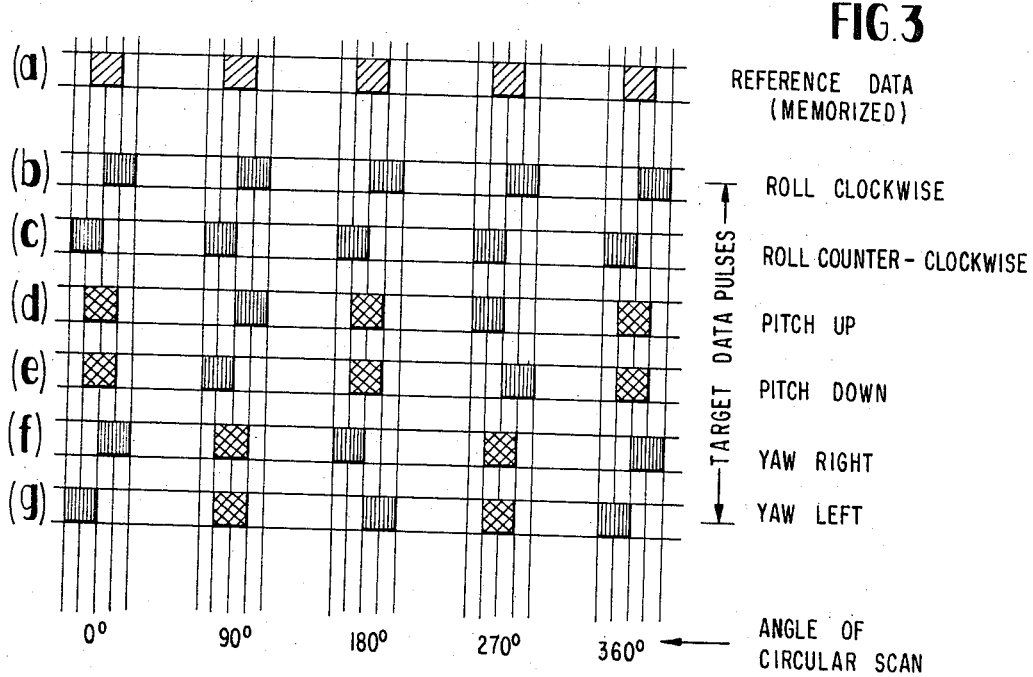
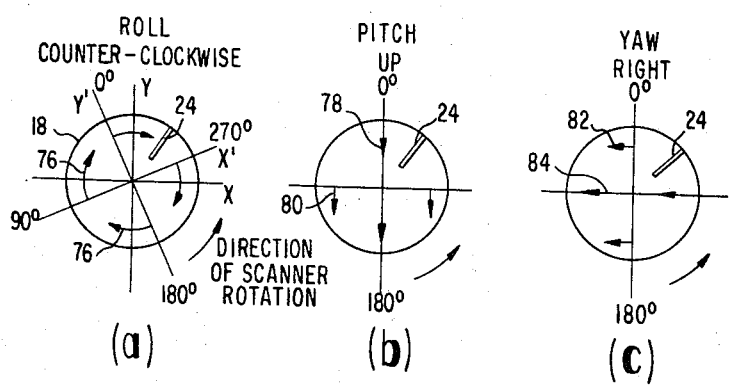
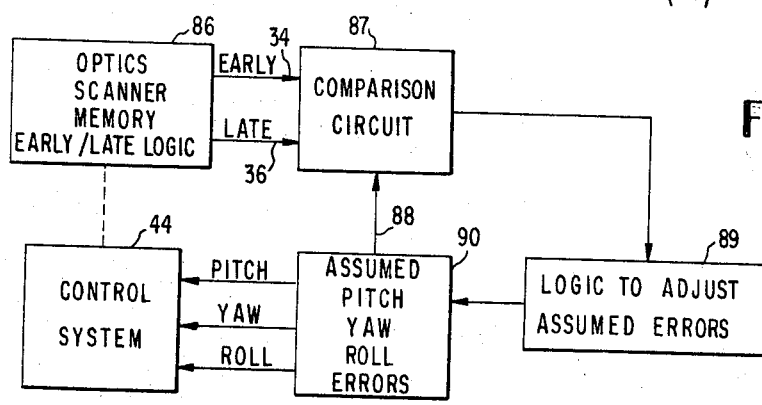
INVENTORS
JAMES R. BOGARD
ROGER A. GASKILL
G. L. HARMON
Julian C. Renfro
ATTORNEY March 12, 1968     J. R. BOGARD ET AL     3,372,890
DATA PROCESSOR FOR CIRCULAR SCANNING TRACKING SYSTEM
Filed Feb. 4, 1966     3 Sheets-Sheet 3

INVENTORS
JAMES R. BOGARD
ROGER A. GASKILL
G. L. HARMON
BY
Julian C. Renfro
ATTORNEY

United States Patent Office

3,372,890
Patented Mar. 12, 1968

3,372,890
DATA PROCESSOR FOR CIRCULAR SCANNING TRACKING SYSTEM
James R. Bogard, Roger A. Gaskill, and George Lamar Harmon, Orange County, Fla., assignors to Martin-Marietta Corporation, Baltimore, Md., a corporation of Maryland
Filed Feb. 4, 1966, Ser. No. 525,090
24 Claims. (Cl. 244—3.17)

ABSTRACT OF THE DISCLOSURE

This invention relates to a novel data processor particularly adapted for utilization in a closed loop correlation tracking system which utilizes a stable iterative process for converting tracking error signals into stable yaw, pitch and roll error signals. These error signals are employed by a three axis servo to cause the difference between the line of sight axis and the boresight axis to converge to zero, thus to keep the tracking system aligned in a desired manner with a chosen target.

---

The present invention relates to data processing equipment, and more particularly to a tracking system including a novel data processor which converts information related to the relative phase angle between two signals into roll, pitch, and yaw commands for use by the tracking system.

In the general type of tracking system to which the invention pertains there is provided means to circularly scan the target area and to develop a contrast pattern which uniquely characterizes the target. Missile guidance systems of this general type, known as circular scanning area trackers have been employed both with active scanners, e.g., radar, as well as with passive scanners, e.g., optical or infra-red detectors.

There is often included in such area tracking systems a memory which can store a reference contrast pattern for the particular target. The reference pattern may either be pre-stored prior to initiation of a flight or, the system may be arranged so that successive patterns are stored during range closure between the target and the missile. The scanner then operates to provide a "live contrast pattern" of the area within the field of view of the tracker at that time. The memorized and live patterns are compared, and correlation signals produced from which are derived control signals for use by the tracker.

In the circular scanning system of this invention, the currently scanned pattern comprises either a continuous signal, or a train of pulses, representative of the contrast pattern within successive portions of the entire 360° of the field of view of the scanner. Similarly, information stored in the memory represents the target contrast as a function of the scanner angle. These two signals are compared and information generated representative of the phase difference between the memorized contrast pattern and the live contrast pattern. This information is further processed and roll, pitch and yaw control signals generated for realigning the tracker in relation to the scanned target in order to minimize the angular misalignment between the scanned and memorized contrast patterns.

There have been proposed a number of constructions for area tracking systems. Of these, many include no provision whatever for roll stabilization. Thus, and in fact, the performance of such systems is often seriously degraded if the scanned image rolls to any significant extent.

Those systems which do not make provision for the generation of roll information have been characterized by a number of undesirable features. For example, in these systems the data processor for converting correlation information into guidance commands have been open loop sub-systems within the overall tracking system. Such arrangements are characterized by a high level of cross coupling in the control signals, i.e., a pitch error generates a certain amount of yaw output signal, and vice versa. Excessive cross coupling results in marginal stability for the control system, and especially tends to cause "helixing." Thus can be a critical problem particularly in electro-optical tracking systems which rememorize the target contrast pattern during range closure. Another problem inherent in many of the open loop systems previously known is the tendency to stabilize on incorrect control values unless the contrast data from which error signals are derived is distributed uniformly over 360°.

In addition, many of the above-described prior systems have been extremely complicated and have employed various memory systems to permit the solution of three simultaneous equations by which the roll, pitch and yaw control signals are generated.

In contrast, the data processor of the present invention is an independent closed-loop sub-system within the control loop and operates in an iterative manner to rapidly determine appropriate values of roll, pitch, and yaw control signals on the basis of a succession of comparisons between the currently scanned contrast pattern and the contrast pattern stored in the system memory. The system is characterized by a total absence of static cross-coupling between the control signals and by the facility to conveniently compensate for dynamic cross-coupling. Similarly, the static accuracy of the system is substantially independent of the angular distribution of the contrast data used for computation, and the effects thereof on dynamic accuracy may conveniently be minimized. The system is further characterized by a relatively uncomplicated mechanization, and by the adaptability for use with both continuous or discrete phase comparison data, the latter either in the form of pulse amplitude information, or pulse width information. The system is readily adaptable for use with both active scanners of the radar type, and passive scanners of the electro-optical type.

The system comprises a closed loop for solving in an iterative manner, the appropriate control equation for the tracker. It includes circuitry to compare an assumed solution of the equation with up-to-date information as to the phase relationship between stored target information and live target information as well as circuitry which responds to an error in the assumed solution to adjust the assumed values for comparison with subsequent phase information.

Accordingly, it is a general object of the present invention to provide a tracking system including an improved data processor.

It is also an object of this invention to provide an area tracker of the circular scanning type including an improved data processor to generate control commands in response to a phase comparison between stored target information and currently obtained target information.

It is a further object of this invention to provide a tracking system including a closed-loop data processor for the iterative solution of an equation to generate control commands based on a phase comparison between stored target information and current target information generated externally to the data processor.

It is another object of this invention to provide a tracking system including a closed-loop data processor as described above which does not require the storage of a plurality of values of input information.

It is also an object of this invention to provide a circular scanning tracker having a data processor as described above characterized by a complete independence of the static accuracy thereof upon both the angular distribution of incoming data, and the number of samples thereof, if at least one sample exists per degree of freedom, and also, by the absence of static cross-coupling between the control commands.

It is further an object of this invention to provide a circular scanning tracking system including a data processor as described above in which the effect of dynamic cross-coupling in the control commands is minimized.

It is a related object of this invention to provide a tracking system as described in which the effect of the angular distribution of incoming data on the dynamic accuracy may readily be minimized.

It is an additional object of this invention to provide an improved data processing system for solving an equation including a plurality of variables.

A further object of the present invention is to provide an improved data processing system for generating roll, pitch and yaw commands in response to indications of the angular relationship between a stored target contrast pattern and a currently acquired target contrast pattern representing values generated externally to the data processing system.

It is also an object of this invention to provide a closed-loop data processor for generating roll, pitch and yaw commands by successive approximation to the solution of an equation involving a plurality of variables.

It is an additional object of this invention to provide a data processor as described above characterized by relative lack of complexity and high static accuracy, independent of the angular distribution of the incoming data.

It is also an object of this invention to provide a data processor as described above, further characterized by the absence of static cross-coupling in the control commands and by a relatively minor effect thereon of dynamic cross-coupling.

It is also an object of this invention to provide a data processing system for the iterative solution of a multi-variable equation including circuitry to compare a proposed solution of the equation with up-to-date information as to the phase relationship between stored information and currently acquired information and circuitry which responds to the existence of an error in the assumed values of the solution to adjust the assumed values for comparison with subsequent phase information.

The exact nature of this invention as well as other objects and advantages thereof will be clear from the following detailed description and the accompanying drawings in which:

FIGURE 2 is a diagram showing the effect on the contrast pattern generated by the scanner of angular motion of the missile relative to the target being scanned;

FIGURE 3 is a diagram representative of possible variations in the input information presented to the early/late logic shown in FIGURE 1 as a result of the angular motion shown in FIGURE 2;

FIGURE 4 is a generalized block diagram showing portions of the system of FIGURE 1 with emphasis on the novel data processing system of this invention;

Figure 1A:
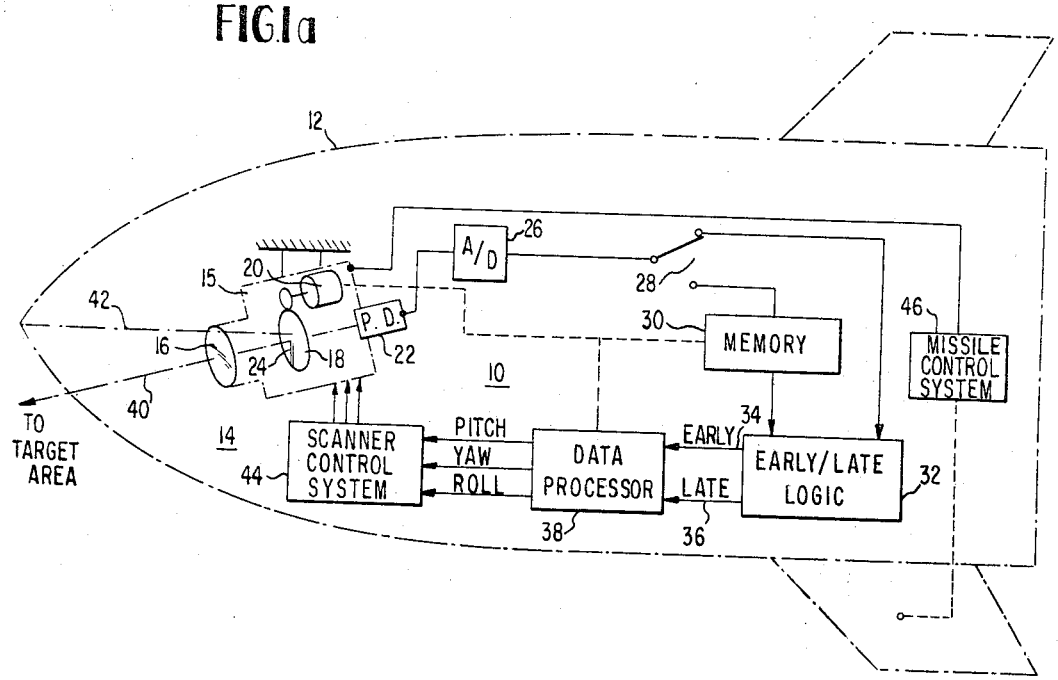
FIGURE 1a is a diagram depicting the overall features of the present invention as embodied in a missile guidance system.

Referring now to FIGURE 1a, the tracking system of the present invention, generally denoted at 10, is shown incorporated in the guidance system of a missile 12. The tracker includes a circular scanner 14, shown mounted in the forward portion of missile 12. Scanner 14 includes a housing or mounting structure 15, wherein there is positioned as described below, an optical portion 16, an opaque disk 18, a motor 20 for rotating disk 18, and a photo-detector 22. Disk 18 includes a narrow, generally radial slit 24, by which small portions of the field of view of the scanner may be viewed in succession. Motor 20 may be adapted to rotate disk 18 by means of the gearing arrangement shown schematically in the figure, or in any other suitable manner. The output of photo-detector 22 is connected to an analog to digital converter 26. Although photo-detector 22 is shown connected to analog to digital converter 26, as will be explained hereinafter, the system may be readily adapted for operation with continuous data, in which case the converter is not necessary, and may be omitted.

The aforementioned portions of the system are mounted in any suitable manner to permit rotating disc 18 to circularly scan narrow portions of a target area along the line of sight of the tracker 14, thereby generating an angularly dependent contrast pattern which uniquely characterizes the area immediately surrounding the instantaneous tracker aim point.

The output of converter 26 is connected by means of a switching arrangement shown schematically as a two position switch 28 as an input to a memory system 30. Switch 28 also provides a direct connection for the incoming scanner data to an early/late logic unit 32. A second input to early/late logic unit 32 is provided from memory 30. Early/late logic circuit 32 processes the live and reference contrast patterns to provide a pair of output signals on leads 34 and 36, representative of the instantaneous phase difference between the memorized and current contrast patterns to a data processing unit 38. Processor 38 converts the phase information into pitch, roll and yaw correction signals for the reorientation of scanner 14.

As shown in FIGURE 1a, scanner 14 is so mounted within missile 12 using gimbals or other means as to permit freedom of motion thereof around a set of roll, pitch, and yaw axes. The system is arranged so that under conditions of normal flight, with little or no angular misalignment between the instantaneous and desired aim points, scanner center line 40 and the longitudinal axis 42 of the missile are substantially aligned. However, should the desired aim point be associated with a moving target, or if some disturbance has caused a deviation of the missile from the desired flight path, the angular misalignment signals thus generated by processor 38 will be provided to a scanner control system 44 which operates in a conventional manner to reorient scanner 14 so that the line of sight 40 thereof again points toward the desired target. This could be done electrically or mechanically with gimbals.

Then, in order to realign missile 12 with scanner 14, there is provided within or on housing 15, suitable sensors and/or computational processes by which the angular motion of the scanner required to eliminate the angular misalignment, may be measured. The sensor output signals drive a conventional missile control servo system 46 which adjusts the missile control surfaces to bring the longitudinal axes 40 and 42 into alignment.

Alternatively, scanner 14 may be mounted within missile 12 in what may be termed "strapped down fashion." In that case, scanner housing 15 is rigidly fixed within the missile, with longitudinal axes 40 and 42 in permanent alignment. In such a case, the signals generated by control system 44 are used directly to operate the missile control surfaces, in order to keep the missile aim point aligned with the desired aim point stored in memory 30.

In general, it is more desirable that the tracker axis be freely movable relative to the missile, since the scanner itself is moderately small and can be made to respond more rapidly and accurately to angular misalignment of the desired and actual aim points if angular motions of the entire missile 12 are decoupled from the scanner optic axis. If the scanner is strapped down within the missile, its response to target variations will, of necessity, be slower. Therefore, a considerably wider field of view for the optical portion of the system would be necessary, in order to prevent complete disappearance of the target area image from the scanner field of view due to rapid changes in orientation. However, a widening of the field of view may perhaps be undesirable due to loss of accuracy or because of increased demands on the quality and nature of the optical system used.

Figure 1B:
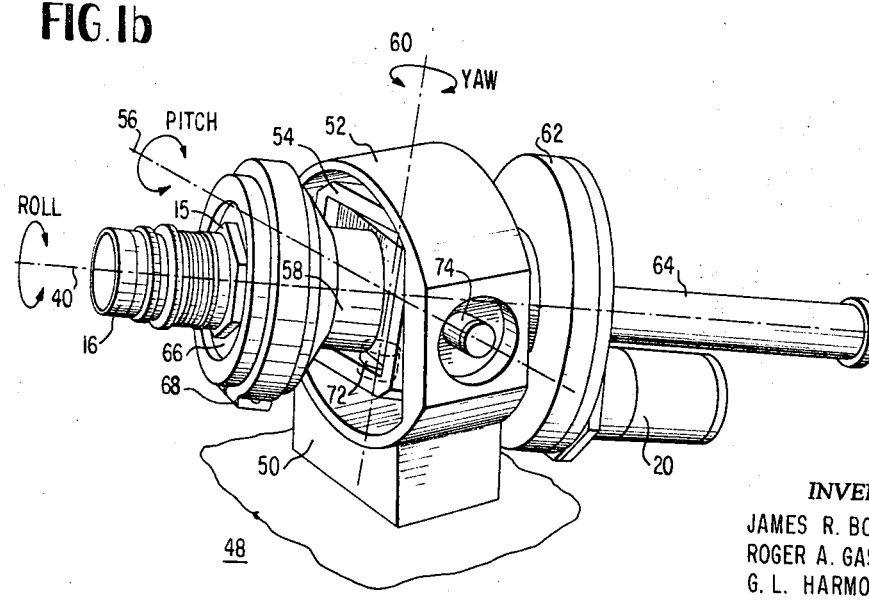
FIGURE 1b is a fragmentary view of FIGURE 1a showing the construction of one type of tracker suitable for use in connection with the present invention.

A suitable mounting arrangement for the above-described case of free rotation of the scanner is shown schematically in FIGURE 1b.

Such a mounting arrangement includes a supporting structure 48 adapted for rigid mounting within the missile 12. Support 48 includes a base portion 50 and an outer ring 52 within which the remainder of the system is positioned. An inner ring 54 is pivotally mounted within outer ring 52, to permit rotation of the entire scanner 14 about a first axis 56 normal to the center line 40 thereof. Inner ring 54 is conventionally mounted and includes means for supporting therein a tubular member 58 which actually supports the housing 15 of scanner 14. Tubular member 58 is pivotally supported in generally the same manner as inner ring 54, to permit rotation thereof about a further axis 60 mutually perpendicular to center line 40 and axis 56. Tubular member 58 includes an internal bearing arrangement therein to permit rotation of the scanner housing 15 around center line 40.

Optical system 16, which may be an appropriate lens, is threadedly mounted at one end of housing 15. A further housing 62, which encloses rotating memory disc 30, is mounted at the other end of housing 15. Disc motor 20 is mounted on housing 62, in order to conveniently rotate both memory disc 30, and also the scanning disc 18 which is on a common shaft with disc 30. Scanning disc 18 is located forward on the aforementioned common shaft, and falls on the image plane of optics 16. An internal light pipe therefore, may be used to transmit light from radial slit 24 to photodetector 22. Also attached to housing 62 is a closed chamber 64 which serves as a container for photo-detector tube 22. The optical system 16, housing 62, disc motor 20 and chamber 64 are connected to housing 15, and thus may rotate freely about center line 40 within tubular member 58.

Thus, it may be seen that scanner 14 is free to rotate with three degrees of freedom, i.e., about axes 56 and 60 as well as around the center line 40. For purposes of this discussion, motion about axis 60 will be denoted as yaw, motion around axis 56 will be denoted as pitch, and motion around center line 40 will be denoted as roll. The arrow directions shown in FIGURE 1b represent clockwise roll, upward pitch, and rightward yaw, respectively.

As explained below, comparison of the information stored in memory 30 and live information provided by scanner 14 (see FIGURE 1a), results in phase difference signals which may be processed according to this invention to generate signals indicative of the amount of roll, pitch, and yaw, of scanner 14. According to the embodiment shown, these signals may be used to realign the scanner with respect to the reference angular positions around axes 56 and 60, and around the scanner center line 40.

To provide for realignment around the roll axis, there may be provided a conventional torque motor 66 mounted in an expanded portion 68 of tubular member 58 and arranged to cooperate in a conventional manner with a rotor means attached to rotatable housing 15.

Similarly, torque motor 72 is fixedly mounted to inner ring 54 and serves to rotate tubular member 58 within ring 54 about yaw axis 60.

A third torque motor 74 is mounted on outer ring 52 and serves to rotate inner ring 54 around pitch axis 56.

Thus, in response to angular misalignment between the desired aim point as defined by the contrast pattern stored in memory 30, and the actual aim point, as indicated under rest conditions by longitudinal axis 42, torque motors 66, 72 and 74, will be operated to rotate scanner 14 so that center line 40 thereof is in fact angularly aligned with the desired missile aim point. Then, signals generated by further sensors (not shown) serve to operate missile control system 46 shown in FIGURE 1a to realign axes 40 and 42 as previously explained.

Mounting arrangement 48 is not shown in great detail since the manner of its construction is not a part of this invention. In fact, any appropriate mounting arrangement, either freely rotatable or fixed, may be used, as will be understood by those skilled in the art in view of the present disclosure.

The effect on the output of photo-detector 22, or other equivalent signal detectors, caused by roll, pitch, or yaw of the instantaneous tracker aim point relative to the desired aim point, is shown in detail in FIGURES 2 and 3. First, with reference to FIGURES 2a–2c, there is shown a rotating scanner, represented by a disc 18 including a narrow generally radial slit 24, which is continuously scanned over the field of view of the tracking system to provide target contrast signals as a function of angle. For purposes of explanation, it may be assumed that disc 18 is continuously rotating in a counter-clockwise direction about the scanner center line 40 relative to a pair of reference axes X and Y, as shown in FIGURES 2a through 2c. A separate set of axes X' and Y' serve as a reference for roll, pitch, and yaw, as shown in FIGURE 1b.

The effect of a counter-clockwise roll of the tracker axes relative to the X–Y reference axes is depicted in FIGURE 2a. For roll in the direction of scanner rotation, the scanned contrast pattern will appear to be shifted in the clockwise direction, as denoted by arrows 76, causing it to appear earlier in time than it would under zero-roll conditions. As may be understood for a given counter-clockwise roll angle, a constant phase shift will be introduced in the scanned data independent of the angular position of slit 24.

FIGURE 3 shows a comparison between a typical memorized contrast pattern as a function of scanner angle (assumed to have been stored under conditions of zero pitch, roll and yaw), and currently acquired target contrast patterns received under various conditions of pitch, roll, and yaw. Comparing lines a and c, it may be seen that a constant angle of counter-clockwise roll, and zero angles of pitch and yaw, the current pattern leads the memorized pattern by a fixed angle.

As may be understood, if the roll angle is clockwise, rather than counter-clockwise, the contrast pattern is shifted in the counter-clockwise direction thereby causing (assuming a constant angle of roll) a fixed phase leg between the current and memorized patterns, independent of the angle of slit 24. This effect may be seen by comparison of lines a and b of FIGURE 3.

Referring now to FIGURE 2b, there may be seen the effect of a constant upward pitch angle and zero angles of roll and yaw. Assuming first that scanner slit 24 is positioned at zero degrees relative to the X and Y axes (i.e., slit 24 in a vertical position) contrast information represented by downward pointing arrow 78 will appear in its proper angular position. This is shown in lines a and d of FIGURE 3, where a zero value of the scan angle produces phase coincidence between the memorized data and the current data.

When slit 24 is positioned at 90° relative to the scanner coordinate system, the 90° target data indicated by arrow 80 is displaced downward causing an effective delay in the time of appearance of the information in slit 24. As shown in lines a and d of FIGURE 3, this is manifested in a phase lag of the live pattern relative to the memorized pattern. When scanner slit 24 reaches its vertical position at 180°, there will be no displacement of target information away from the 180° position, and therefore, as in the case of target information at 0°, will be neither delayed nor advanced in the path of travel of the scanning slit. This is shown in lines *a* and *d* of FIGURE 3 by the time coincidence between the current pattern and the memorized pattern at 180°. Finally, when scanner slit 24 reaches the 270° position, it may be seen that the contrast pattern will be displaced downward from the zero pitch position causing it to appear in scanner slit 24 somewhat before the slit reaches the 270° position. This is shown in lines *a* and *d* of FIGURE 3 as a phase lead of the current pattern relative to the memorized pattern at 270°.

As may be understood, for a constant downward pitch angle, arrows 78 and 80 in FIGURE 2*b* will be reversed causing an early appearance of the data located at 90°, and a late appearance of the data situated at 270°, without changing the angular position of the data at 0° and 180°. This situation is depicted in lines *a* and *e* of FIGURE 3.

Referring to FIGURE 2*c*, there is shown the situation in which the tracking system is positioned at a constant yaw angle to the right and at zero values of both roll and pitch angle. The effect of the constant displacement in FIGURE 2*c* is to cause a corresponding opposite displacement of the target data pulses as indicated by the leftward pointing arrows 82 and 84. As may be understood, when scanner slit 24 is positioned at 0°, in FIGURE 2*c*, the 0° contrast information is displaced to the left away from slit 24, causing a time delay shown in lines *a* and *f* of FIGURE 3 as the phase lag of the current pattern relative to the reference pattern at 0°. By continued analysis as outlined above, the remaining phase shifts between the current and memorized patterns may readily be derived.

The patterns shown in FIGURE 3 are present under assumed constant non-zero values of only one of the roll, pitch and yaw angles at a time. It may be appreciated, that in general, such ideal conditions will not exist. Actually, the orientation of the tracking system coordinate axes will be characterized by simultaneously varying angles of roll, pitch and yaw. Therefore, it may be understood that target data pulses will not appear in the simplified patterns shown in FIGURE 3, but rather as a randomly varying train of pulses related in a complicated manner to the simplified data configurations shown.

In addition, if the reference pattern is rememorized during range closure, any angular misalignment between the tracker and the target at the time of rememorization will be lost and the new reference will be the standard of zero pitch, roll, and yaw angles.

Furthermore, the data configurations shown in FIGURE 3 represent only points of contrast in the vicinity of 90°, 180°, etc. However, the exact nature of the pulse information will be determined by the size and extent of these points of contrast, and the rate of rotation of the circular scanner 18, as well as by the instantaneous orientation of the tracking system. Nonetheless, it has been found that by correlation of the train of contrast pulses stored in memory 30 with the live information produced by rotating scanner 16 and by appropriately processing the result of such correlation, an acurate determination may be made of the angular misalignment between the instantaneous tracker aim point and the desired aim point in terms of the roll, pitch and yaw components thereof.

Referring again to FIGURE 1, the first step in the correlation and processing program described above, requires the storage of a reference pattern in memory 30. This may either be prestored before the missile flight or may be inserted during the flight to serve as a reference during the terminal phase of the flight. In fact, one or more rememorizations may be necessary to assure accurate guidance. Switch 28 controls rememorization, and may be operated automatically or manually. Automatic operation may be brought about in accordance with the teachings of the Clyde R. Hembree application entitled "Correlation Guidance System Having Multiple Switchable Field of View," Ser. No. 536,834, filed Mar. 23, 1966, and assigned to the assignee of the present invention.

Next, it is necessary to provide an accurate measurement of the instantaneous phase difference between the stored data and that currently provided by rotating scanner 18. Such a result can be accomplished in any one of a number of ways, although the technique shown in the present assignee's co-pending United States patent application Serial No. 509,993 of G. L. Harmon filed Nov. 26, 1965, and entitled "Binary Phase Comparator" is preferred. The circuitry of the Harmon application is represented herein by early/late logic 32 and it provides a convenient and accurate means for determining the average advance or delay between similar but random pulse trains. The Harmon system provides a signal at a first one of its outputs (denoted as 34 in FIGURE 1) whenever the current data leads the memorized data, and a second output (denoted 36) when the current data is delayed relative to the memorized data. The system is so arranged that the durations of the respective output signals are proportional to the amount of advance or delay between the input pulse trains.

While the construction of the Harmon application represents a preferred form for the early/late logic 32 shown in the present invention, it should be recognized that a number of alternative configurations may be used. For example, the remainder of the system is entirely compatible with an early/late logic unit 32 having a single output, the polarity of which is indicative of the sense of the phase displacement and in which either the amplitude or the duration of the output pulse determines the amount of phase lead or phase lag. Alternatively, various continuous-data phase comparison devices may be readily accommodated by data processor 38.

A previously described, a significant feature of the present invention is the technique and apparatus by which the early/late information generated by logic unit 32 is transformed into useful angular control information for control system 44. Operation thereof is based on the discovery that the values of the roll, pitch and yaw angles will directly affect the amount of energy in the instantaneous correlation between the memorized target contrast pattern, and the current target contrast information obtained by scanner 16 according to the following relationship:

$$C_i = R + P \sin \theta_i + Y \cos \theta_i \quad (1)$$

where $C_i$ = the energy in the correlation signal generated by early/late logic circuit 32;
$R$ = the instantaneous roll angle of the scanner relative to axis 40 shown in FIGURE 1*b*;
$P$ = the instantaneous pitch angle of the scanner relative to axis 56;
$Y$ = the instantaneous yaw angle of the scanner relative to axis 60;
$\theta_i$ = the instantaneous angle of the scanner (e.g., relative to the X, Y axes shown in FIGURES 2*a* through 2*c*) corresponding to the particular value of correlation energy $C_i$.

Unfortunately the solution of Equation 1 imposes a number of practical limitations which prevent its accomplishment in a straightforward manner. Equation 1 implies a system of simultaneous equations in 3 unknowns, i.e., R, P, Y. Such a system of equations could be solved if three or more pairs of values of $C_i$ and $\theta_i$ could be made available simultaneously, in which case, it would be possible to directly determine values of R, P and Y. However, because of the nature of the scanning system and because correlation energy pulses $C_i$ are generated one at a time by early/late logic 32, a plurality of equations in the form of Equation 1 cannot be satisfied simultaneously since it is impossible to define such equations simultaneously.

According to the present invention, it has been found possible to overcome the above difficulty by means of a converging iterative solution using successive pairs of values $C_i$ and $\theta_i$ to rapidly arrive at accurate values of R, P, and Y.

An appropriate technique for the solution of Equation 1 may be obtained as follows: For each pair of values of $C_i$ and $\theta_i$, Equation 1 may be regarded as defining a plane in R, P, Y space. The distance D from an arbitrarily selected point M* in R, P, Y space, having the coordinates (R*, P*, Y*) to the plane instantaneously defined by values $C_i$ and $\theta_i$ is given by:

$$D = \frac{C_i - (R^* + P^* \sin\theta_i + Y^* \cos\theta_i)}{[1 + (\sin\theta_i)^2 + (\cos\theta_i)^2]^{1/2}} \quad (2)$$

where the numerator may be regarded as representing the algebraic difference or "error" between the correlation energy $C_i$ and a "synthetic" correlation signal $C_i^*$ based on the arbitrarily chosen point M* (R*, P*, Y*).

The contribution to the numerator of Equation 2 of the roll, pitch and yaw are approximately given by:

$$\begin{aligned} \overline{R} &= 0.7D = 0.7(C_i - C_i^*) \\ \overline{P} &= 0.7D \sin\theta_i = 0.7(C_i - C_i^*) \sin\theta_i \\ \overline{Y} &= 0.7D \cos\theta_i = 0.7(C_i - C_i^*) \cos\theta_i \end{aligned} \quad (3)$$

Thus, the corrections $R_c$, $P_c$ and $Y_c$, which must be added to the respective values chosen for the coordinates of the point M* in order that the point will satisfy Equation 1 are given by:

$$\begin{aligned} R_c &= \overline{R} \\ P_c &= \overline{P} \\ Y_c &= \overline{Y} \end{aligned} \quad (4)$$

A practical manner of exploiting the above relationships, is to assume a point M* having the coordinates (0, 0, 0) until the first early/late signal is provided over one of leads 34 and 36 (i.e., a value of $C_i$) as a result of the operation of scanner 16. At this time, the initial coordinates of the point M* are modified in accordance with Equations 3 and 4, i.e., a point N* is chosen having the coordinates ($0 \pm 0.7D$, $0 \pm 0.7D \sin\theta_i$, $0 \pm 0.7D \cos\theta_i$). Thus, as may be seen the coordinates of new trial point N* are so chosen that N* is guaranteed to lie in the plane defined by the values of $C_i$ and $\theta_i$.

For the next received values of $C_i$ and $\theta_i$, the trial point N* as defined above, rather than M* (0, 0, 0) is used to generate further corrections for $R_c$, $P_c$, and $Y_c$.

As may be understood, each successive $C_i$ pulse generated by early/late logic 32 will define a new plane in R, P, Y space. Upon receipt of a sufficient number of pairs $C_i$ and $\theta_i$, it may be seen that there will be a common point S* at the intersection of all of the planes, representing (assuming a sufficiently slow time variation of the roll, pitch and yaw of the system relative to the rate of correlation energy pulses) an exact solution to the system equations implied by Equation 1. In fact, it has been found that as long as 3 or more pairs $C_i$, $\theta_i$ are provided for each complete rotation of the scanner, the points M*, P* . . . etc. will rapidly converge to S*, the desired solution.

It has been found that the iterative technique inherently tends to overcome the effects of noise in the early/late signals provided by logic circuit 30. Additional noise rejection may be achieved by scaling the correction signals defined by Equations 3 and 4 as follows:

$$\begin{aligned} R'_c &= KD \\ P'_c &= KD \sin\theta_i \\ Y'_c &= KD \cos\theta_i \end{aligned} \quad (5)$$

where K is less than or equal to 0.7. The choice of a value of K less than 0.7 will not only improve the system's resistance to noise, but in many instances will also facilitate the rapid convergence of M*, N* . . . S* to the desired solution.

A mechanization of the iterative solution described above is shown by the functional diagram of FIGURE 4.

Here, the portions of FIGURE 1a identified as 14 through 32 are denoted by a single functional block labeled 86. The early/late signals are provided as shown in FIGURE 4 over leads 34 and 36 respectively to a comparison circuit 87. The synthetic correlation signal $C_i^*$ is provided over lead 88. Comparison circuit 87 responds to the early/late signals and to the value of $C_i^*$ to generate the error signal $C_i - C_i^*$ representative of the difference between the correlation energy in the early/late signals and in the synthetic correlation signal.

Comparison circuit 87 is connected to the logic circuitry 89 which generates the correction signals defined by Equations 4 and 5 above to modify the values of M*, thereby assuring that the next trial point (e.g. N*) will satisfy Equation 1 for the most recent pair of values $C_i$ and $\theta_i$.

The output of logic unit 89 is fed to a further circuit 90 which modifies the coordinates of the previous trial points in accordance with the signals from unit 89 and generates the pitch, yaw and roll commands for transmission to control system 44.

Circuit 90 also provides the signal $C_i^*$ over lead 88 to comparison circuit 87 thereby defining a closed-loop processing sub-system within the overall closed loop tracking system.

Figure 5:
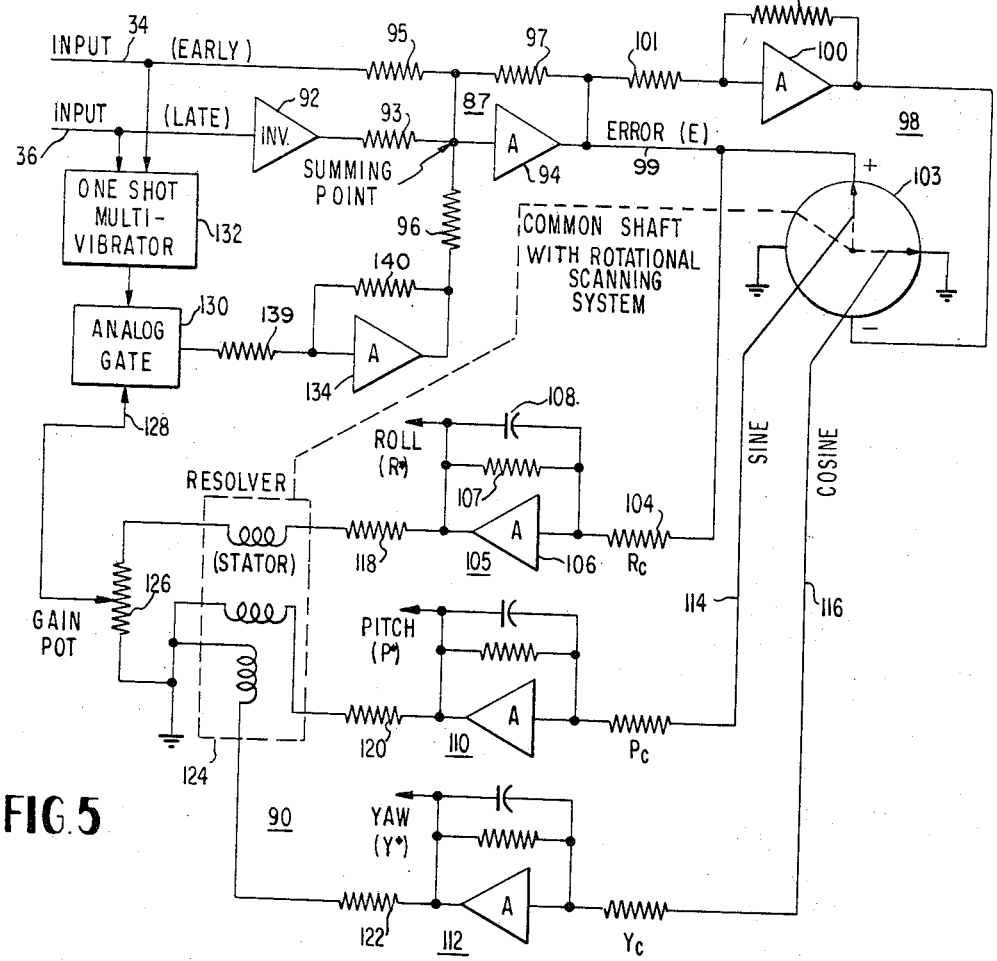
FIGURE 5 is a circuit diagram showing one embodiment of the data processing system depicted generally in FIGURE 4; and, FIGURE 6 shows a modification of a portion of the circuitry of FIGURE 5 as an alternate construction thereof.

Referring now to FIGURE 5, there is shown a detailed circuit diagram of an implementation for the units denoted 87, 89 and 90 in FIGURE 4. As shown, comparison circuit 87 includes an inverting amplifier 92 inserted in signal path 36 to provide a polarity distinction between early signals and late signals. Inverter 92 is a digital inversion about ground reference, that is, it is a saturating amplifier that is connected through an input resistor 93, as one input of a high gain operational amplifier 94. A second input to amplifier 94 is provided through a resistor 95 directly from input signal path 34. A third input to amplifier 94 is provided through a resistor 96 and represents the $C_i^*$ signal as explained below. Amplifier 94 operates as a summing amplifier by virtue of the resistive feedback path 97 connected between its output and the common connection between input resistors 93, 95 and 96 to generate the signal $C_i - C_i^*$.

As will thus be seen, the comparison circuit 87 serves to sum together the early pulses, which may be of positive polarity, with the late pulses, which are inverted by inverting amplifier 92 to negative pulses, and with the feedback voltage from an inverter amplifier 134 (discussed hereinafter) to cause an output error signal on lead 99 which represents the actual real time signal in pulse form.

It should be understood that the particular configuration shown including inverter 92 is required to distinguish between early/late signals generated by a logic unit 32 such as that disclosed in the aforementioned Harmon application, since separate signals of like polarity are used to indicate positive and negative phase differences. On the other hand, if the construction of logic unit 32 is such that the sense of the phase difference is indicated by the polarity of a single output, then the function of inverter 92 and input resistor 93 is inherently accomplished, and these two circuit elements may be dispensed with.

Unit 89 of FIGURE 4 includes an inverter 98 comprising a high gain amplifier 100, an input resistor 101, and a feedback resistor 102, in a known configuration connected as the negative input to a sine/cosine potentiometer 103, as shown in FIGURE 5. A positive input to potentiometer 103 is provided directly from the output of summing amplifier 94. As may be understood, potentiometer 103 serves to multiply the signal $C_i - C_i^*$ by the appropriate function of the angle $\theta_i$ in accordance with the requirements of Equations 3–5. Potentiometer 103 is mechanically coupled to scanner 18 (FIGURE 1a) so that the proper angular relationships are maintained.

Referring again to Equations 3–5, it may be seen that the value of $R_c$ is independent of the angle $\theta_i$ and may be generated by simply scaling the value of the signal $C_i - C_i^*$ appearing at the output of comparison circuit 87. This signal is provided directly to an input resistor 104 for an integrator 105 comprised of a high gain amplifier 106 and an RC feedback circuit, including resistor 107 and capacitor 108. By proper selection of the value of resistors 104 and 107, and of capacitor 108, integrator 105 is arranged to provide the required scaling factor of 0.7 found in Equations 3 and 4; or the more general factor $K \leq 0.7$ of Equation 5.

Resistor 107 operates as a D.C. leakage path and serves to overcome possible random leakage paths. While the charge stored on capacitor 108 is reduced somewhat between successive values $C_i$, the rate at which new data is received is sufficiently great so that such leakage may be ignored.

As may be understood, the signal appearing at the output of integrating amplifier 105 is equal to the coordinate $R^*$. Thus, as successive values of $C_i - C_i^*$ are provided on lead 99, the signals stored in integrator 105 are updated. More specifically, as succeeding values of $C_i$ are provided over one of leads 34 or 36, and corresponding changes in the value of $C_i - C_i^*$ are generated by comparison circuit 87, the value of $R^*$ is changed by an amount 0.7D so that the R coordinate of the points $M^*$, $N^* \ldots$, continues to satisfy Equation 1.

Command signal generator 90 includes an additional pair of integrating circuits 110 and 112 of identical configuration as integrator 105. These integrators serve to generate and store the pitch command $P^*$ and yaw command $Y^*$, respectively. As required by Equations 3-5, the correction signal $P_c$ is proportional to the sine of the angle $\theta_i$ and the yaw correction signal $Y_c$ is proportional to the cosine of the angle $\theta_i$. Thus, integrators 110 and 112 are connected by means of leads 114 and 116 to the sine and cosine outputs respectively of potentiometer 103. As in the case of signal $R^*$, the outputs of integrators 110 and 112 represent the P and Y coordinates of a point $M^*$ such that Equation 1 is satisfied for the most recently received signal pair $C_i$, $\theta_i$.

To complete the feedback portion of the data processing loop, the outputs of each of integrators 105, 110, and 112 are provided through input resistors 118, 120 and 122, respectively, as inputs to a servo resolver 124 of well-known construction. Resolver 124 is mechanically coupled to sine/cosine potentiometer 103 and rotating disc 18 to maintain proper angular relationships. The resolver functions to generate the signals $P^* \sin \theta_i$ and $Y^* \cos \theta_i$, (see Equation 2), and to add the two products to $R^*$; the summation being equal to the correlation signal $C_i^*$. This signal is thereafter sampled and inverted so as to adapt it to the summing process effected in comparison circuit 87.

The output of resolver 124, which may be called the composite error signal, is connected through a gain control potentiometer 126 in order to permit adjustment of the closed-loop gain of the data processor. The output of potentiometer 126 is provided over lead 128 to an analog gate 130 which receives a conditioning input from a suitable one-shot multivibrator 132, which in turn is operated only when a signal appears on one of input leads 34 or 36.

The output of analog gate 130 is connected by means of inverting amplifier 134 of construction identical to inverting amplifier 98. This amplifier employs input resistor 139 and feedback resistor 140. The output of inverting amplifier 134 is then fed through input resistor 96 of comparison circuit 87 as previously mentioned to close the feedback loop. Thus, as may be understood, the signal $C_i^*$ appearing on lead 128 is a constant reflection of a solution of an equation such as Equation 1 for points $M^*$ $N^* \ldots S^*$ which points will rapidly and accurately converge to the unique solution of the equation. With each succeeding value of $C_i$, the points $M^*$, $N^* \ldots$ will more and more closely approach $S^*$. If, upon the receipt of a value of $C_i$, the previously chosen coordinates of the trial point generate a $C_i^*$ equal to the new value of $C_i$, then $C_i - C_i^* = 0$ will be generated and the unique solution to Equation 1 will have been reached. In this case, no new values of $R_c$, $P_c$, and $Y_c$ are generated, and the outputs of integrators 105, 110, and 112 remain fixed, accurately representing the instantaneous value of the roll, pitch and yaw angles of the tracking system relative to the reference coordinate system. These signals may then be used in known manner by control system 44 to reorient scanner 14 so that the instantaneous aiming point is in angular alignment with the desired aiming point.

Figure 6:
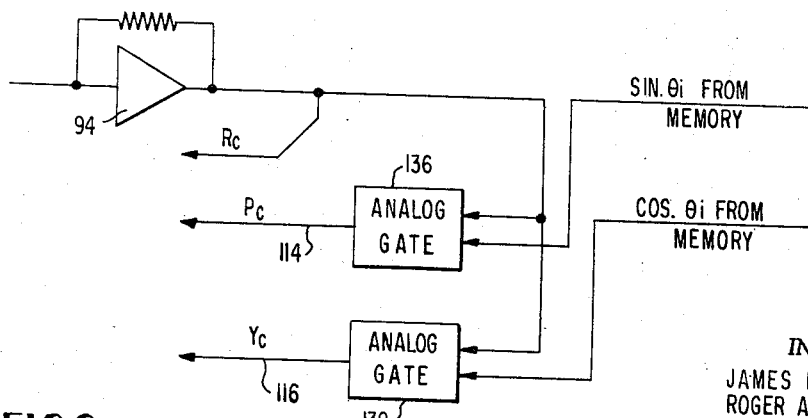

In FIGURE 6 is shown a modification of the system of FIGURE 5 in which an electronic resolver circuit is substituted for sine/cosine potentiometer 103. Here memory 30 (see FIGURE 1), which is synchronized with scanner 14 provides signals equal to the sine and cosine of the scanner angle $\theta_i$. The resolver itself includes a pair of analog gates 136 and 138 having as first inputs thereto $\sin \theta_i$ and $\cos \theta_i$ respectively, provided from memory 30. The signal $C_i - C_i^*$ is fed as second input to each of gates 136 and 138 from the output of comparison circuit 87. As may be understood, the error signal is modulated by the sine and cosine signals to produce the required $P_c$ and $Y_c$ signals while the roll signal $R_c$ is generated as in FIGURE 5 by direct connection of the output of comparator 87 to integrator 105. Of course, servo-resolver 124 shown in FIGURE 5 may also be replaced by an electronic resolver as may be understood by one skilled in the art in light of the above discussion.

It should be pointed out, that the closed-loop technique disclosed by the present invention differs in concept from that of the classical closed-loop system, since such systems are normally modifications of an otherwise usable open-loop system, the closed-loop generally being used to improve the accuracy and/or band width characteristics of the open-loop. In contrast, the technique of the present invention is both simplified and rendered operative by the use of the closed loop. An open-loop solution of a control equation, such as Equation 1 would require considerable storage of correlation information and scan angles and the computation of a least squares fit of roll, pitch and yaw angles with respect to the stored data. According to the present invention, considerably less information need be stored (i.e., only the constantly updated values of $R_c$, $P_c$, and $Y_c$) while the complicated process of least squares computation is replaced by the considerably simpler iterative system disclosed herein.

As may be understood from the above description, the closed loop data processor 38, as well as tracking system 10 in its entirety is characterized by heretofore unobtainable accuracy and compatibility with a variety of scanning systems. For example, while the scanning system has been shown to include optical unit 16, rotating disc 18, and motor 20, it should be understood that substantial variation of the construction thereof is possible. For example, the scanning system need not be of the passive type, but may be of the radar type. This adds the feature of all weather operation to the system. Similarly, the mechanical scanner may be replaced by an optical scanning system of the television type, without modification of the closed-loop data processor 38. Under such circumstances, electronic stabilization of scanner 14 may be utilized, rather than the gimballing arrangement shown, while scanning would be accomplished by biasing the camera read beam in appropriate fashion.

In addition, various modifications in optical system 16 are contemplated. For example, a variable field of view system such as disclosed in assignee's co-pending U.S. patent application to Clyde R. Hembree may readily be substituted for the optical system shown herein.

Furthermore, the technique of this invention utilizes comparison of the energy levels of the correlation signals and therefore the system may be readily adapted to operate with correlation pulses of fixed amplitude and variable duration, as in the above-described embodiment or with a correlation signal generator providing an output signal of fixed duration and variable amplitiude. Of course, various modifications of the actual circuitry depicted in FIGURES 5 and 6 are possible. For example, for use of the system with a continuous, rather than digital contrast pattern, analog gate 130 and enabling multivibrator 132 will be unnecessary, and may simply be eliminated. In addition, while an analog mechanization has been shown, it should be understood that digital circuitry performing similar functions could be substituted for that of FIGURE 5.

Also, while the invention has been embodied in the form of a missile control system, it should be undestood that other systems including a circular scanning tracker and means to control roll, pitch and yaw errors are within the scope of the invention.

Except for the effects of noise, static accuracy of the method is independent of the angular distribution of the data pulses because the actual equations relating to roll, pitch, and yaw are solved for each data pulse. In the absence of noise, all that is required for an exact solution is the presence of at least three data pulses per scan. However, additional data pulses are desirable to increase the rate of convergence and to decrease the effects of noise. In the present system, a certain amount of dynamic cross-coupling between $R^*$, $P^*$, and $Y^*$ occurs due to the finite time required for convergence of the solution to Equation 1. Such cross-coupling manifests itself as a lag error, but is readily controllable by increasing the scan rate and/or by servo compensation techniques normally used to reduce lag error.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A data processor for use in a circularly scanning tracker to convert energy levels indicative of phase differences between the contrast pattern of tracked target and that of a stored reference pattern into roll, pitch and yaw correction signals, a particular energy level $C_i$ being determinable from the relationship.

$$C_i = R + P \sin \theta_i + Y \cos \theta_i$$

where R, P and Y equal the tracker roll, pitch, and yaw errors, respectively, and $\theta_i$ equals the scanner angle relative to a reference axis, comprising means to generate and store trial signal values of roll, pitch, and yaw errors, means to generate a trial signal $C_i^*$ according to the relationship $$C_i^* = R^* + P^* \sin \theta_i + Y^* \cos \theta_i$$

where $R^*$, $P^*$, and $Y^*$ represent the trial signal values, means to compare externally generated signal values of $C_i$ with the signal $C_i^*$, and means to cause the difference between $C_i$ and $C_i^*$ to be minimized.

2. The data processor of claim 1 where the last named means comprises means to modify the stored signal values of the $R^*$, $P^*$, and $Y^*$ in accordance with the difference between $C_i$ and $C_i^*$.

3. The data processor of claim 2 where the means to modify the stored signal values comprises means to generate correction signals $R_c$, $P_c$, and $Y_c$, according to the relationships $$R_c = KD$$
$$P_c = KD \sin \theta_i$$
$$Y_c = KD \cos \theta_i$$

where D is approximately equal to 0.7 $(C_i - C_i^*)$, and means to perform the algebraic summations $$R^* + R_c$$
$$P^* + P_c$$
$$Y^* + Y_c$$

and to up-date the stored trial signal values accordingly.

4. The data processor as set forth in claim 3 where K is less than or equal to approximately 0.7.

5. The data processor of claim 3 where the means to generate the signal $R_c$, comprises scaling means directly connecting the output of the comparing means to the means to generate and store the signal $R^*$, and where the means to generate the signals $P_c$ and $Y_c$ comprises electronic resolver means including first and second analog gates connected to the comparing means, the first gate having means to receive a signal proportional to sine $\theta_i$, the second analog gate having means for receiving a signal proportional to cosine $\theta_i$, the output of the first analog gate being connected to the means to store the signal $P^*$, and the output of the second gate being connected to the means to store the signal $Y^*$.

6. The data processor of claim 3 where the means to generate signal $C_i^*$ comprises scaling means connected to the means to store the signal $R^*$, means to multiply the signal $P^*$ by sine $\theta_i$, means to multiply the signal $Y^*$ by cosine $\theta_i$, and means to generate the algebraic summation of the outputs of the three last-named means.

7. The data processor of claim 3 including means to adjust the gain of the closed-loop defined by the trial signal generating means, the comparing means, the means to generate the signals $R_c$, $P_c$, and $Y_c$, the means to generate and store values of $R^*$, $P^*$, and $Y^*$, and the means to modify the stored signals in accordance with the signals $R_c$, $P_c$, and $Y_c$.

8. The method of guiding a missile which comprises storing a record characterizing the contrast of the area about a desired aim point as a function of an angle $\theta$ relative to a reference axis, operating scanning means by circularly scanning the area about current aim point to develop a contrast pattern thereof as a function of the angle $\theta$, generating a signal representing the phase difference between the stored and currently generated records, the energy $C_i$ in the phase difference signal at a particular angle $\theta_i$ varying in accordance with the relationship $$C_i = R + P \sin \theta_i + Y \cos \theta_i$$

where R, P, and Y equal roll, pitch, and yaw errors in the orientation of the scanning means, processing successive phase difference signals in an iterative manner to obtain corrections for the scanning means roll, pitch and yaw errors, and modifying the orientation of the scanning means in accordance with the obtained roll, pitch, yaw corrections.

9. The method of claim 8 including sensing the orientation of the scanning means, and steering the missile so as to substantially follow variations in scanner orientation.

10. The method of claim 8 where the step of processing comprises arbitrarily selecting and storing trial signal values $R^*$, $P^*$, and $Y^*$ of roll, pitch, and yaw errors respectively, developing a trial signal $C_i^*$ in accordance with the relationship $$C_i^* = R^* + P^* \sin \theta_i + Y^* \cos \theta_i$$

comparing the signals $C_i$ and $C_i^*$, and correcting the stored signal values of $R^*$, $P^*$, and $Y^*$, in accordance with the difference between $C_i$ and $C_i^*$.

11. The method of claim 10 where the step of correcting comprises developing a series of signals $$R_c = KD$$
$$P_c = KD \sin \theta_i$$
$$Y_c = KD \cos \theta_i$$

where D approximately equals 0.7 ($C_i−C_i^*$), developing the algebraic summations:

$$R_c+R^*$$
$$P_c+P^*$$
$$Y_c+Y^*$$

and modifying the stored signal values in accordance therewith.

12. The method of claim 10 where at least three comparison and corrections are made per revolution of the scanner.

13. A tracker for determining angular misalignment between the actual aim point of a missile and a desired aim point, including memory means to store signal as a record indicative of the appearance of the area around the desired aim point, means to generate signals as a record of the appearance of the area around the instantaneous aim point, means to generate a signal representing the misalignment between the stored signals record and the current records; a closed-loop data processor including means to generate and store trial signal values of misalignment angles, means to generate signals representative of the misalignment which would result between the current and stored records for such trial signal values, means to compare the actual and misalignment signals, and means to minimize the difference between the actual and misalignment signals.

14. The tracker as set forth in claim 13 wherein means to minimize the difference between the actual and misalignment signals are provided, which comprise means to modify the trial signal values to minimize the difference between the actual misalignment and that associated with the trial signal values.

15. The system of claim 14 where the tracker is freely mounted within the missile, and where the means to modify the orientation of the tracker comprises means responsive to the trial signal values of the misalignment angles to rotate the tracker with respect to its mounting.

16. The system of claim 15 including means to sense the rotation of the tracker with respect to its mounting, and a control system, responsive to the output of the sensing means, to cause the missile to follow changes in the tracker orientation.

17. The tracker as disclosed in claim 14 where the energy $C_i$ is a signal corresponding to the angular misalignment between the desired tracker aim point and the actual aim point is related to tracker roll, pitch, and yaw angles R, P, and Y, respectively, according to the formula:

$$C_i=R+P \sin \theta_i+Y \cos \theta_i$$

wherein the data processor includes means responsive to the trial values $R^*$, $P^*$, $Y^*$, of the roll, pitch, and yaw angles to generate a trial signal:

$$C_i^*=R^*+P^* \sin \theta_i+Y^* \cos \theta_i$$

means connected to the comparator means to generate signals:

$$R_c=KD$$
$$P_c=KD \sin \theta_i$$
$$Y_c=KD \cos \theta_i$$

where D is approximately equal to 0.7 ($C_i−C_i^*$), means to modify the stored values of $R^*$, $P^*$, and $Y^*$ by the algebraic summation therewith of $R_c$, $P_c$, and $Y_c$, respectively.

18. The tracker of claim 17 where the means to generate the signal $R_c$, comprises scaling means directly connecting the output of the comparing means to the means to generate and store the signal $R^*$.

19. The tracker of claim 17 where the means to generate signal $C_i^*$ comprises scaling means connected to the means to store the signal $R^*$, means to multiply the signal $P^*$ by sine $\theta_i$, means to multiply the signal $Y^*$ by cosine $\theta_i$, and means to generate the algebraic summation of the outputs of the three last-named means.

20. The tracker of claim 17 including means to adjust the gain of the closed-loop defined by the trial signal generating means, the comparing means, the means to generate the signals $R_c$, $P_c$, and $Y_c$, the means to generate and store signal values of $R^*$, $P^*$, and $Y^*$, and the means to modify the stored signals in accordance with the signals $R_c$, $P_c$, and $Y_c$.

21. The tracker of claim 17 where the scanner includes means to radiate a scanning signal, and means responsive to reflections of the scanning signal to generate the record signals of the appearance of the current missile target.

22. The tracker of claim 17 where the scanner includes optical means to focus energy reflected from the current target, rotating means including a generally radial slit to successively view portions of the focused energy, and means responsive to the energy passing through the slit to develop electrical signals.

23. A closed loop data processor for converting phase differences between samples of two contrast patterns into information relating to the angular misalignment of the patterns comprising means to generate and store trial values of the misalignment angles, means to generate signals representative of the misalignment which would result between the two patterns for such trial values, and means to modify the trial values to minimize the difference between the actual misalignment and that associated with the trial values, wherein the phase difference between the patterns is represented by the energy in a signal obtained by comparison of corresponding portions of the contrast pattern and where an energy sample $C_i$ is related to R, P, Y, the roll, pitch, yaw misalignment, and to $\theta_i$, an angular reference in the two patterns, by the relationship $$C_i=R+P \sin \theta_i=Y \cos \theta_i$$

and where the means to generate the misalignment signal which would result for trial values $R^*$, $P^*$, and $Y^*$ of roll, pitch, and yaw, comprises means to generate a signal $$C_i^*=R^*+P^* \sin \theta_i+Y^* \cos \theta_i$$

24. The data processor of claim 23 where the means to modify the stored values comprises means to generate correction signals $R_c$, $P_c$, and $Y_c$, according to the relationships $$R_c=KD$$
$$P_c=KD \sin \theta_i$$
$$Y_c=KD \cos \theta_i$$

where D is approximately equal to 0.7 ($C_i−C_i^*$), and and means to perform the algebraic summations $$R^*+R_c$$
$$P^*+P_c$$
$$Y^*+Y_c$$

and to up-date the stored trial values accordingly.

References Cited

UNITED STATES PATENTS 2,884,540   4/1959   Shockley _____ 244—3.16
3,143,646   8/1964   Tasker et al. _____ 235—180

OTHER REFERENCES

Solving Simultaneous Linear Equations With an Iterative Computer, January 1965, Instruments and Control Systems, p. 141, by Staff of Systron-Danner Corp., Concord, Calif., p. 1.

BENJAMIN A. BORCHELT, *Primary Examiner.*

T. H. WEBB, *Assistant Examiner.*